US 11,683,571 B2

(12) United States Patent
Smirnov

(10) Patent No.: US 11,683,571 B2
(45) Date of Patent: Jun. 20, 2023

(54) OPTICAL PATH CHANGE MODULE AND CAMERA MODULE

(71) Applicant: SAMSUNG ELECTRO-MECHANICS CO., LTD., Suwon-si (KR)

(72) Inventor: Viatcheslav Smirnov, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 147 days.

(21) Appl. No.: 17/232,414

(22) Filed: Apr. 16, 2021

(65) Prior Publication Data

US 2022/0150389 A1 May 12, 2022

(30) Foreign Application Priority Data

Nov. 11, 2020 (KR) .................. 10-2020-0150242

(51) Int. Cl.
| H04N 5/335 | (2011.01) |
| H04N 23/55 | (2023.01) |
| G03B 17/17 | (2021.01) |
| G06F 1/16 | (2006.01) |

(52) U.S. Cl.
CPC ............. *H04N 23/55* (2023.01); *G03B 17/17* (2013.01); *G06F 1/1686* (2013.01)

(58) Field of Classification Search
CPC .................................................. G03B 17/17
See application file for complete search history.

(56) References Cited

U.S. PATENT DOCUMENTS

| 2015/0002683 | A1 | 1/2015 | Hu et al. |
| 2020/0057313 | A1 | 2/2020 | Lee et al. |
| 2020/0333622 | A1* | 10/2020 | Fujisaki ................. G03B 30/00 |
| 2020/0363626 | A1* | 11/2020 | Seo ......... G03B 30/00 |
| 2021/0033946 | A1* | 2/2021 | Noriyuki ............. H04N 5/2251 |
| 2021/0048650 | A1* | 2/2021 | Yedid ..................... G03B 37/02 |
| 2021/0181460 | A1* | 6/2021 | Lee ......................... G03B 17/17 |

FOREIGN PATENT DOCUMENTS

| CN | 107238913 A | 10/2017 |
| CN | 107888834 A | 4/2018 |
| JP | 2015-92285 A | 5/2015 |
| JP | 5923558 B2 | 5/2016 |

(Continued)

OTHER PUBLICATIONS

Korean Office Action dated Dec. 24, 2021 in corresponding Korea Patent Application No. 10-2020-0150242. (10 pages in English and 7 pages in Korean).

(Continued)

*Primary Examiner* — Gary C Vieaux
(74) *Attorney, Agent, or Firm* — NSIP Law

(57) ABSTRACT

An optical path change module includes: a first rotation holder; a reflection member disposed on the first rotation holder, and configured to change a path of light; a second rotation holder configured to support the first rotation holder; and a module case accommodating the second rotation holder. The first rotation holder is coupled to the second rotation holder, and configured to rotate around a first pivot axis. The second rotation holder is coupled to the module case, and configured to rotate around a second pivot axis intersecting the first pivot axis.

19 Claims, 16 Drawing Sheets

(56) References Cited

FOREIGN PATENT DOCUMENTS

| | | |
|---|---|---|
| JP | 6182740 B2 | 8/2017 |
| JP | 6613005 B1 | 11/2019 |
| JP | 2020-177067 A | 10/2020 |
| KR | 10-2009-0095919 A | 9/2009 |
| KR | 10-2015-0089675 A | 8/2015 |
| KR | 10-2019-0071569 A | 6/2019 |

OTHER PUBLICATIONS

Korean Office Action dated Jun. 27, 2022, in counterpart Korean Patent Application No. 10-2020-0150242 (10 Pages in English, 7 Pages in Korean).

\* cited by examiner

OPTICAL PATH CHANGE MODULE AND CAMERA MODULE

CROSS-REFERENCE TO RELATED APPLICATIONS

This application claims the benefit under 35 U.S.C. § 119(a) of Korean Patent Application No. 10-2020-0150242 filed on Nov. 11, 2020 in the Korean Intellectual Property Office, the entire disclosure of which is incorporated herein by reference for all purposes.

BACKGROUND

1. Field

The following description relates to an optical path change module and a camera module including an optical path module.

2. Description of Related Art

Recently, camera modules have been provided as standard equipment in portable electronic devices such as tablet personal computers (PCs), laptop computers, and the like, in addition to smartphones. Additionally, an autofocusing (AF) function, a zoom function, an optical image stabilization (OIS) function, and the like, have been added to camera modules for mobile terminals.

However, in order to implement functions such as AF, zoom, and OIS functions, a structure of a camera module may be complex and a size of the camera modules may be increased. As a result, a size of a portable electronic device in which the camera module is mounted has also been increased.

In addition, when a lens or an image sensor is directly moved to perform optical image stabilization (OIS), a weight of the lens or the image sensor itself and weights of other members, to which the lens or the image sensor is attached, should be taken into account. Therefore, a certain level of driving force is required, which may increase power consumption.

The above information is presented as background information only, to assist gaining in an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical path change module includes: a first rotation holder; a reflection member disposed on the first rotation holder, and configured to change a path of light; a second rotation holder configured to support the first rotation holder; and a module case accommodating the second rotation holder. The first rotation holder is coupled to the second rotation holder, and configured to rotate around a first pivot axis. The second rotation holder is coupled to the module case, and configured to rotate around a second pivot axis intersecting the first pivot axis.

The first pivot axis may extend through the reflection member.

The first rotation holder may include a mounting surface on which the reflection member is mounted, and a shaft coupling portion disposed on a rear surface of the mounting surface such that the shaft coupling is rotatably coupled to the second rotation holder.

The optical path change module may further include: a sleeve inserted into the shaft coupling portion and having ends in which insertion grooves are respectively formed; and shafts coupled to the second rotation holder and having end portions respectively inserted into the insertion grooves.

The shafts may be in point contact with and coupled to the sleeve.

The second rotation holder may include side portions respectively disposed on sides of the first rotation holder, and a connection portion connecting the side portions to each other. The second pivot axis may extend through the side portions.

The optical path change module may further include: a sleeve inserted into one of the side portions and having end in which an insertion groove is formed; and a shaft coupled to the module case and having an end portion inserted into the insertion groove.

The optical path change module may further include: a first driving portion configured to rotate the first rotation holder about the first pivot axis; and a second driving portion configured to rotate the second rotation holder about the second pivot axis.

The first driving portion may include: a first magnet portion disposed on a lower surface of the shaft coupling portion; and a first coil portion facing the first magnet portion and spaced apart from the first magnet portion by a predetermined distance.

The second driving portion may include: a second magnet portion disposed on an external surface of one of the side portions; and a second coil portion facing the second magnet portion and spaced apart from the second magnet portion by a predetermined distance.

The second driving portion may be disposed on an external surface of one of the side portions and disposed above the second pivot axis. The first driving portion may be disposed parallel to the second driving portion below the second pivot axis.

The first driving portion may include a spiral spring member. The spiral spring member may have one end fastened to the shaft coupling portion, and another end fastened to the second rotation holder.

The second driving portion may include a spiral spring member. The spiral spring member may have one end fastened to the side portion, and another other end fastened to the module case.

Either one or both of the first driving portion and the second driving portion may include a spiral spring member. The spiral spring member may be formed of a shape-memory alloy.

The optical path change module may further include: a sleeve fastened to one of the side portions and having an end in which a first insertion groove is formed; a shaft fastened to the module case and having an end portion in which a second insertion groove is formed; and a spherical member inserted into the first and second insertion grooves to connect the sleeve and the shaft to each other.

The optical path change module may further include: a sleeve inserted into the shaft coupling portion and having an end in which an insertion groove is formed; a shaft coupled to the second rotation holder and having an end portion in which an insertion groove is formed; and a spherical member inserted into the first and second insertion grooves to connect the sleeve to the shaft.

The shaft coupling portion may include an insertion groove formed on the first pivot axis. The optical path change module may further include a shaft having one end inserted into the insertion groove and the other end fastened to the second rotation holder.

In another general aspect, an optical path change module includes: a first rotation holder; a reflection member disposed on a mounting surface of the first rotation holder, and configured to change a path of light; and a second rotation holder configured to support the first rotation holder. The first rotation holder may include a shaft coupling portion disposed on a rear surface of the mounting surface such that the shaft coupling is rotatably coupled to the second rotation holder. The shaft coupling portion may include an insertion groove formed along a pivot axis of the first rotation holder. The second rotation holder may be inserted into the insertion groove such that the second rotation holder is in point contact with the shaft coupling portion.

In another general aspect, a camera module includes an optical path change module including: a first rotation holder; a reflection member disposed on the first rotation holder, and configured to change a path of incident light; a second rotation holder configured to support the first rotation holder; and a module case accommodating the second rotation holder. The camera module further includes a lens module disposed in the module case and including a plurality of lenses; and an image sensor module configured to convert light passing through the plurality of lenses into an electrical signal. The first rotation holder is coupled to the second rotation holder, and configured to rotate around a first pivot axis. The second rotation holder is coupled to the module case, and configured to rotate around a second pivot axis intersecting the first pivot axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
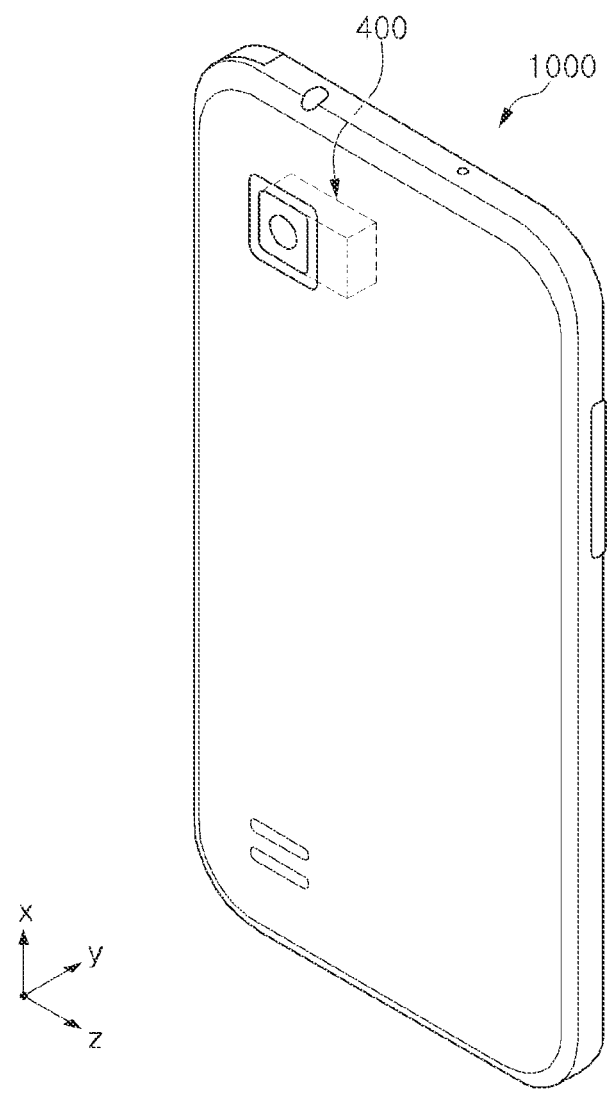
FIG. 1 is a perspective view of a portable electronic device, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

FIG. 1 is a perspective view of a portable electronic device 1000, according to an example.

Referring to FIG. 1, the portable electronic device 1000 may be a portable electronic device such as a mobile communications terminal, a smartphone, a tablet PC, or the like, in which a camera module 400 is mounted. However, the portable electronic device 1000 is not limited to the foregoing examples.

As illustrated in FIG. 1, the camera module 400 is configured to capture an image of a subject. The camera module 400 may include a plurality of lenses.

The camera module 400 may be disposed such that an optical axis (a Z-axis) of each of the lenses is directed in a direction perpendicular to a thickness direction (e.g., a Y-axis direction or a direction from a front surface of the portable electronic device 1000 to a rear surface of the portable electronic device 1000, or a direction opposite to the direction from the front surface of the portable electronic device 1000 to the rear surface of the portable electronic device 1000) of the portable electronic device 1000.

As an example, the optical axis (the Z-axis) of the lenses, included in the camera module 400, may extend in a width direction or a length direction of the portable electronic device 1000.

Accordingly, even when the camera module 400 has functions such as an autofocusing (AF) function, a zoom function, an optical image stabilizing (OIS) function, and the like, a thickness of the portable electronic device 1000 is not increased. Thus, the portable electronic device 1000 may be miniaturized.

Figure 2:
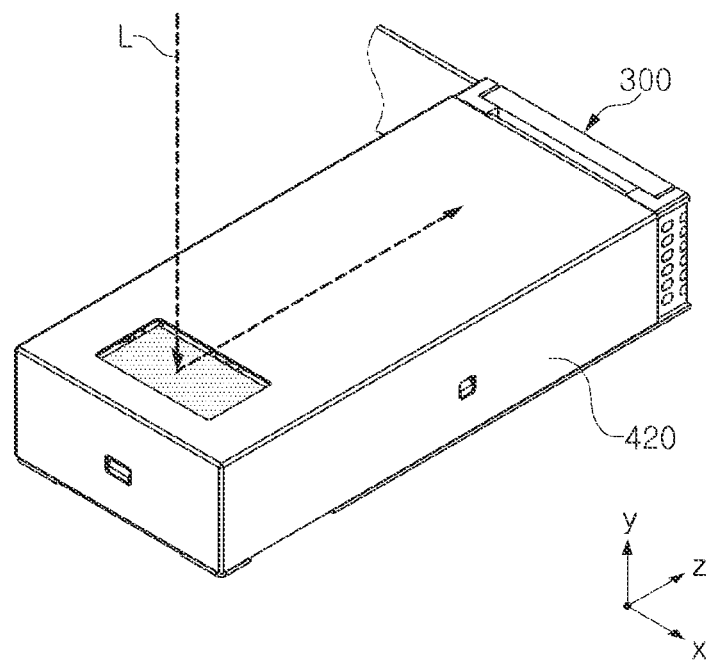
FIG. 2 is a perspective view of a camera module, according to an example.
Figure 3:
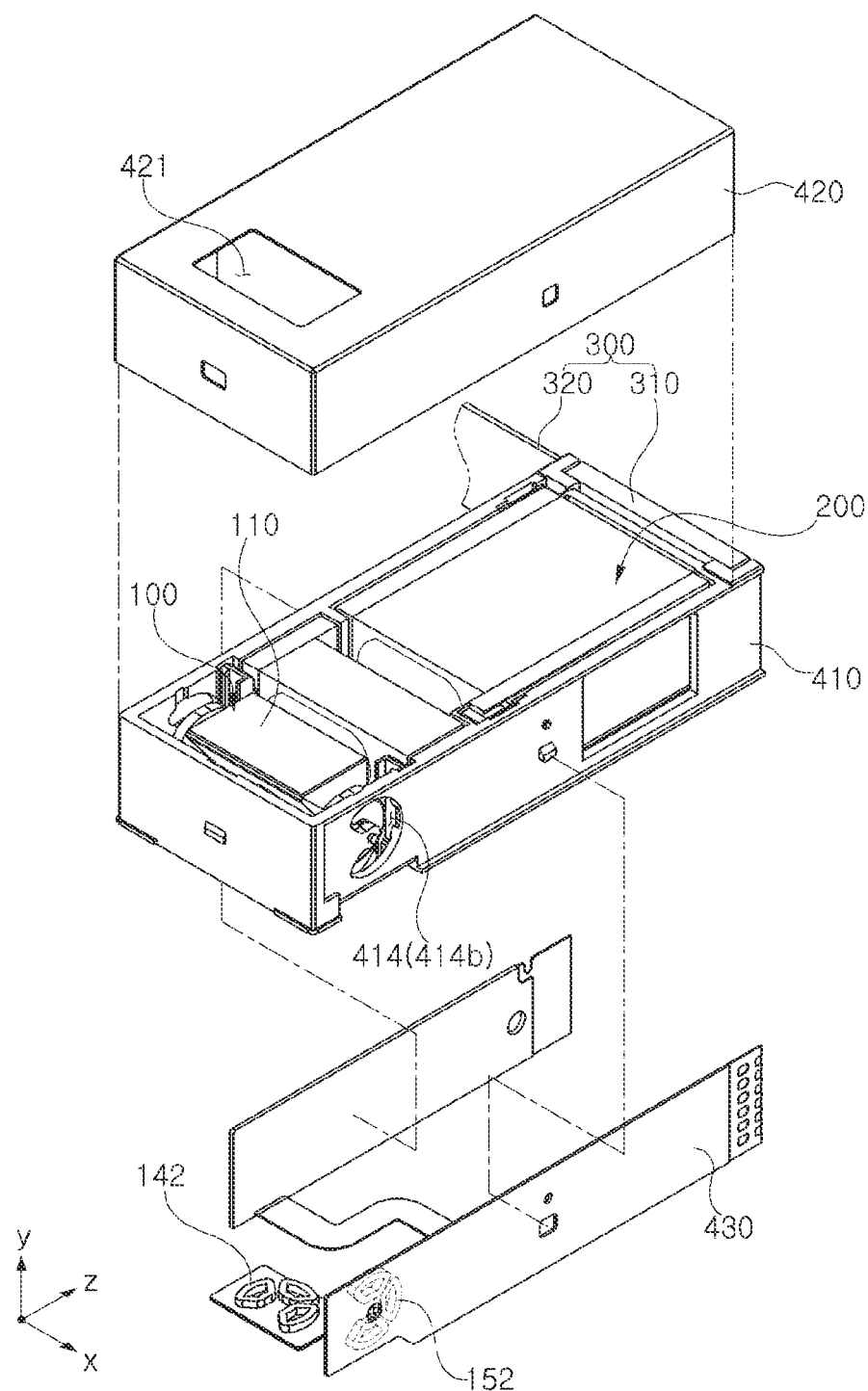
FIG. 3 is a partial exploded perspective view of the camera module illustrated in FIG. 2.

FIG. 2 is a perspective view of the camera module 400, according to an example. FIG. 3 is a partial exploded perspective view of the camera module 400.

Referring to FIGS. 2 and 3, the camera module 400 may include, for example, an optical path change module 100, a lens module 200, and an image sensor module 300.

The optical path change module 100 may change a direction of light travel. For example, a direction of travel of incident light L, which is incident through an opening 421 of a module cover 420, may be changed toward the lens module 200 through the optical path change module 100. Accordingly, the traveling direction of the light L, in which the incident light L is incident to the optical path change module 100, may be changed to match a direction of an optical axis (a Z-axis) while passing through the optical path change module 100. To this end, the optical path change module 100 may include a reflection member 110 configured to reflect the incident light L to change an optical path of the incident light L.

The lens module 200 may include a plurality of lenses through which light traveling in a direction changed by the optical path change module 100 passes. The image sensor module 300 may include an image sensor 310 and a printed circuit board (PCB) 320 configured to convert the light passing through the plurality of lenses into an electrical signal.

The optical path change module 100, the lens module 200, and the image sensor module 300 may be disposed inside a module case 410.

The module case 410 may have an accommodation space in which the optical path change module 100, the lens module 200, and the image sensor module 300 are sequentially disposed in the direction of the optical axis. A module cover 420 may be coupled to the module case 410 to form a case of the camera module 400.

In addition, a circuit board 430 may be coupled to the module case 410. The circuit board 430 may be electrically connected to a driving portion, to be described later, configured to provide an electrical signal to the driver. The circuit board 430 may be a flexible PCB (FPCB), but is not limited thereto.

The circuit board 430 may be disposed along an external surface of the module case 410. The circuit board 430 may be formed in various shapes to be coupled to the module case 410, and at least a portion of the circuit board 430 may be disposed to cover an opening 414 of the module case 410.

The circuit board 430 may be a substrate for optical image stabilization (OIS) components to compensate for shake, such as user hand-shake. In this regard, the circuit board 430 may include a gyro sensor to detect user hand-shake. In addition, the circuit board 430 may include a driving portion IC to prove a driving signal to a driving portion 160 (see FIG. 4) to be described later.

Figure 4:
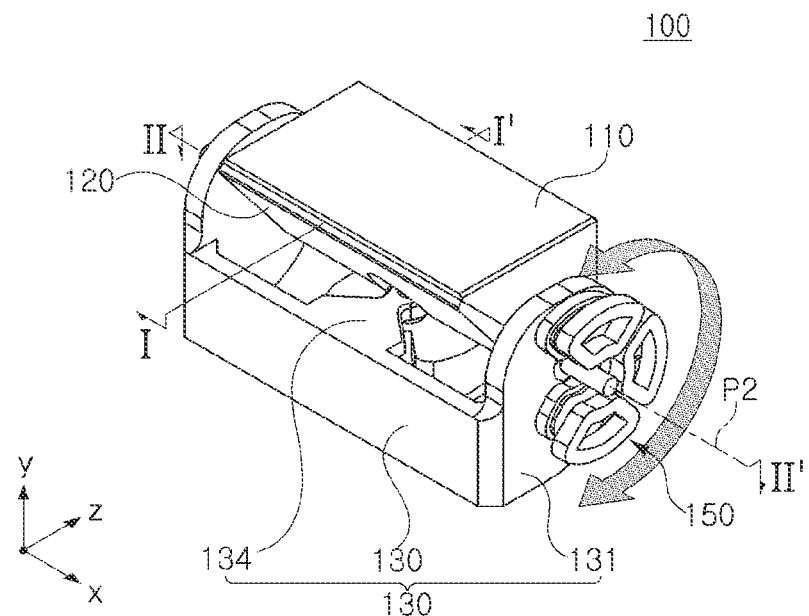
FIG. 4 is a perspective view of an optical path change module, according to an example.
Figure 5:
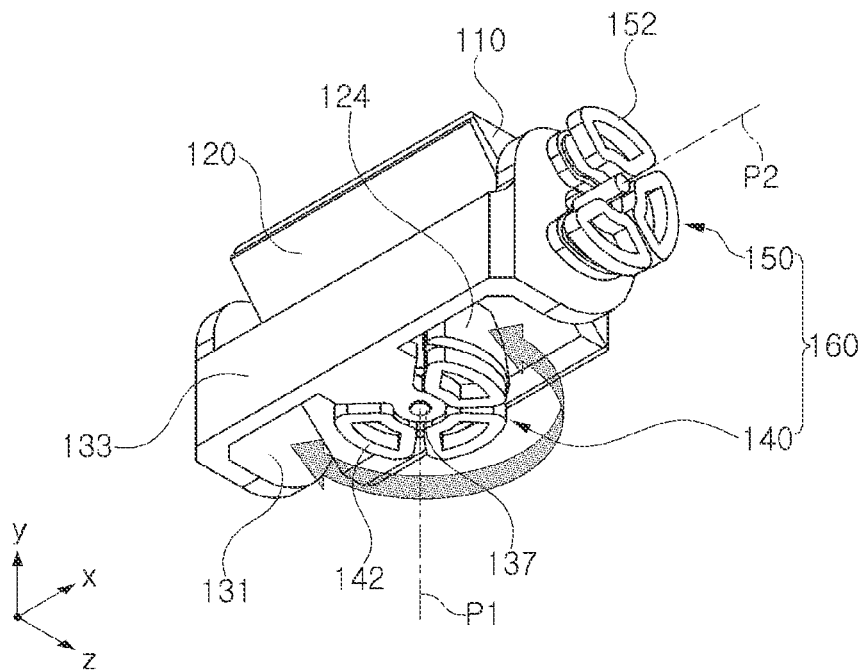
FIG. 5 is a bottom perspective view of the optical path change module illustrated in FIG. 4.
Figure 6:
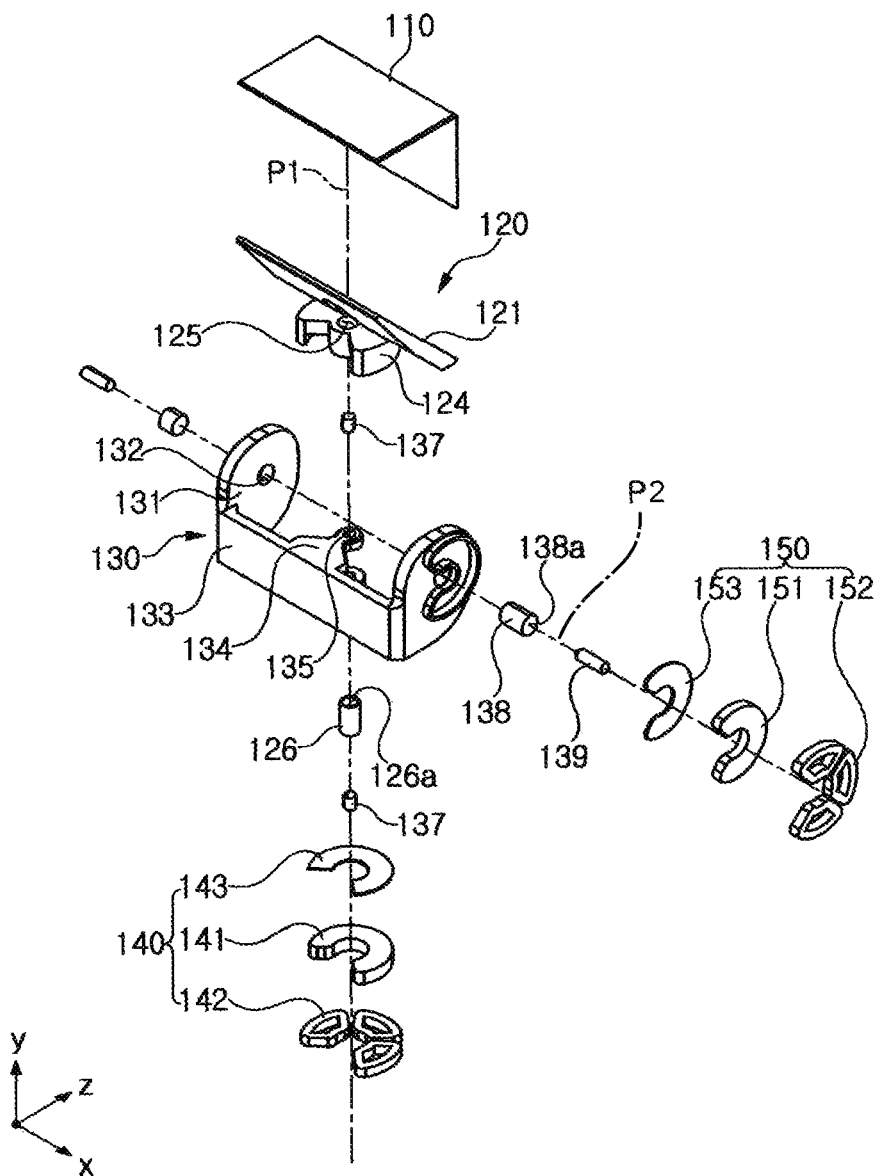
FIG. 6 is an exploded perspective view of the optical path change module illustrated in FIG. 4.
Figure 7:
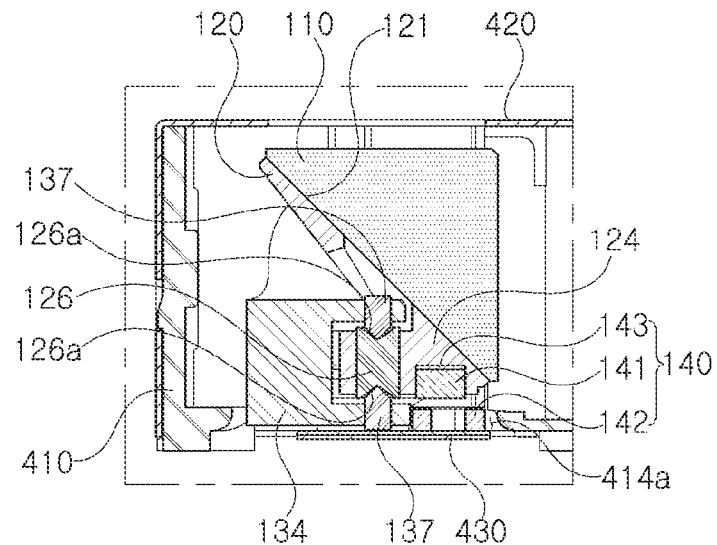
FIG. 7 is a cross-sectional view taken along line I-I' of FIG. 5.
Figure 8:
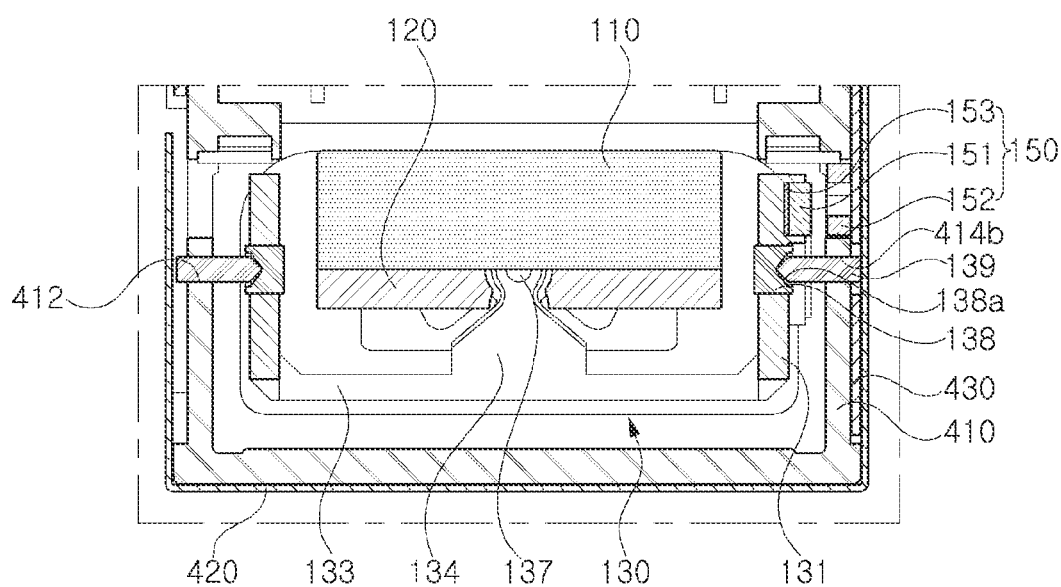
FIG. 8 is a cross-sectional view taken along line II-II' of FIG. 5.

FIG. 4 is a perspective view of the optical path change module 100, according to an example. FIG. 5 is a bottom perspective view of the optical path change module 100. FIG. 6 is an exploded perspective view of the optical path change module 100. FIG. 7 is a cross-sectional view taken along line I-I' of FIG. 5. FIG. 8 is a cross-sectional view taken along line II-II' of FIG. 5.

Referring to FIGS. 4 to 8, the optical path change module 100 may include a reflection member 110, a first rotation holder 120 on which the reflection member 110 is mounted, a second rotation holder 130 supporting the first rotation holder 120, and a driving portion, or driving assembly, 160.

The reflection member 110 may change a direction of light travel. For example, a mirror or a prism configured to reflect light may be used as the reflection member 110.

The reflection member 110 may be fixed to the first rotation holder 120. The first rotation holder 120 may be provided with a mounting surface 121 on which the reflection member 110 is mounted.

The mounting surface 121 of the first rotation holder 120 may be an inclined surface. As an example, the mounting surface 121 may be inclined at 45 degrees with respect to an optical axis (a Z-axis) of a plurality of lenses.

The first rotation holder 120, on which the reflection member 110 is mounted, may be coupled to the second rotation holder 130 to be movable within the second rotation holder 130. As an example, the first rotation holder 120 may rotate around a first axis (a Y-axis) within the second rotation holder 130. Accordingly, the reflection member 110, while mounted on the first rotation holder 120, may rotate around the first axis (the Y-axis) together with the first rotation holder 120.

A first pivot axis P1, which is a pivot axis of the first rotation holder 120, and a second pivot axis P2, which is a pivot axis of the second rotation holder 130, may be disposed to be perpendicular to each other. In addition, the first pivot axis P1 and the second pivot axis P2 may be disposed to intersect each other. The phrase "disposed to intersect each other" may mean that the first pivot axis P1 and the second pivot axis P2 are disposed to intersect at one or more points.

In addition, the first pivot axis P1 and the second pivot axis P2 may be disposed to pass through a reflection point of the incident light L that is incident to the reflection member 110.

The second rotation holder 130 may rotate around a second axis (an X-axis) within the module case 410. Accordingly, the first rotation holder 120 and the reflection member 110 may also rotate around the second axis (the X-axis) with the movement of the second rotation holder 130.

The first axis (Y-axis) and the second axis (X-axis) are perpendicular to the optical axis (Z-axis), and the first axis (Y-axis) and the second axis (X-axis) are perpendicular to each other.

The first rotation holder 120 may include a shaft coupling portion 124 disposed on a rear surface of the mounting surface 121. The shaft coupling portion 124 is a portion in which the first pivot axis P1, which is the pivot axis of the first rotation holder 120, is disposed, and is rotatably coupled to the second rotation holder 130.

The first pivot axis P1 may be disposed to extend through the reflection member 110. More specifically, the first pivot axis P1 may be formed by an axis penetrating through the shaft coupling portion 124 and the reflection member 110.

For example, the first pivot axis P1 may be formed by coupling a first shaft 137 to a first sleeve 126. For example, the first pivot axis P1 may be formed by inserting the first sleeve 126 into the shaft coupling portion 124 of the first rotation holder 120 and coupling the first shaft 137 to each of two ends of the first sleeve 126.

The first sleeve 126 may have a cylindrical shape and may have concave insertion grooves 126a formed in both ends thereof, respectively. Therefore, two first shafts 137 may be provided. Each of the first shafts 137 may be coupled to the first sleeve 126 by inserting a first end of each of the first shafts 137 into a respective insertion groove 126a.

As illustrated in FIG. 7, the insertion grooves 126a of the first sleeve 126 may be formed to have a depth that increases in a direction toward a center of the first sleeve 126. For example, each of the insertion grooves 126a may be formed as a conical groove. However, a shape of the insertion grooves 126a is not limited to a conical shape.

The first ends of the first shaft 137 that are inserted into ends of the respective insertion grooves 126a may be formed as a sharp ends. Accordingly, the first shafts 137 may be disposed such that the first ends are in point contact with the centers of the respective insertion grooves 126a, and thus, contact areas between the first shafts 137 and the first sleeve 126 may be significantly reduced. The first ends of the first shafts 137 may be formed to be sharper than the insertion grooves 126a.

Since the first ends of the first shafts 137 are disposed to be in point contact with the centers of the respective insertion grooves 126a, the first rotation holder 120 may rotate around the first pivot axis P1, which connects the first ends of the first shafts 137 to each other.

Second ends of the first shafts 137 may be fixedly fastened to the second rotation holder 130. Accordingly, the first rotation holder 120 may be coupled to the second rotation holder 130 to be rotatable about the first pivot axis P1.

The first rotation holder 120 may include a fastening hole 125 formed in the shaft coupling portion 124 along the first pivot axis P1, and the first sleeve 126 may be inserted into the fastening hole 125 to be fixed to the shaft coupling portion 124. However, the disclosure is not limited to the aforementioned configuration, and various modifications may be made. For example, the first sleeve 126 may be omitted and an insertion groove may be directly formed in the shaft coupling portion 124.

The second rotation holder 130 may be disposed to be rotatable about the second axis (the X-axis) within the module case 410. Accordingly, the first rotation holder 120 and the reflection member 110 may rotate around the second axis (the X axis) together with the second rotation holder 130.

The second rotation holder 130 may be coupled to the first rotation holder 120 such that the second rotation holder 130 covers a portion of the first rotation holder 120. To this end, the second rotation holder 130 may include side portions 131 respectively disposed on both sides of the first rotation holder 120, and a connection portion 133 connecting the two side portions 131 to each other.

Since the first rotation holder 120 may rotate around the first pivot axis P1 within the second rotation holder 130, the first rotation holder 120 may be disposed to be spaced apart from the side portion 131 by a predetermined distance to prevent mutual interference. Accordingly, a distance between the two side portions 131 may be greater than a width of the first rotation holder 120.

The second pivot axis P2, which is the pivot axis of the second rotation holder 130, may be disposed in the two side portions 131.

The second pivot axis P2 may extend through the two side portions 131 and the module case 410. The second pivot axis P2 may extend in a direction perpendicular to side surfaces of the side portions 131. Similarly to the first pivot axis P1, the second pivot axis P2 may include second sleeves 138 respectively coupled to the side portions 131, and second shafts 139 having first ends respectively coupled to the second sleeves 138 and second ends coupled to the module case 410.

As illustrated in FIG. 8, an end portion of the second sleeve 138 facing the second shaft 139 may include an insertion groove 138a, and the second shaft 139 may have a first end, which may be a sharp end, inserted into the insertion groove 138a of the second sleeve, and may be coupled to the second sleeve 138.

The side portions 131 may include fastening holes 132, through which the second sleeves 138 are fastened, formed along the second pivot axis P2. The module case 410 may include fastening holes 412, through which the second shafts 139 are fastened, formed along the second pivot axis P2. Each of two second shafts 139 may be fixedly coupled to fastening holes 412 in opposite sides of the module case 410 to insert the first end of each of the two second shafts 139 into the insertion groove 138a of a respective second sleeve 138.

Since the first rotation holder 120 is disposed between the two second sleeves 138, the insertion groove 138a may be formed in only one end, facing the module case 410, of the second sleeve 138.

A contact structure of the second sleeve 138 and the second shafts 139 may be the same point contact structure as the above-described point contact structure of the first sleeve 126 and the first shafts 137, and, thus, a detailed description of the point contact structure of the second sleeve 138 and the second shafts 139 will be omitted.

The second rotation holder 130 may include holder support portions 134 protruding from the connection portion 133 to the first rotation holder 120. The first shafts 137, which are coupled to the first rotation holder 120, may be fastened to the holder support portions 134. Therefore, the holder support portions 134 may protrude from the connection portion 133 by a predetermined distance to provide a space in which the first rotation holder 120 is rotatable.

Two holder support portions 134 may be disposed to be spaced apart from each other by a predetermined distance, and the shaft coupling portion 124 may be inserted between the two holder support portions 134. Therefore, the two holder support portions 134 may be disposed to be spaced apart from each other by a distance corresponding to a thickness of the shaft coupling portion 124.

The first shafts 137 may be respectively fastened to the holder support portions 134. Accordingly, each of the holder support portions 134 may include a fastening hole 135, through which a respective first shaft 137 is fastened, formed along the first pivot axis P1.

The driving portion 160 may provide driving force to rotate the second rotation holder 130 about a first axis and to rotate the first rotation holder 120 about a second axis.

The driving portion 160 may include first and second magnet portions 141 and 151 and first and second coil portions 142 and 152 disposed to be spaced apart from the first and second magnet portions 141 and 151, respectively, by a predetermined distance and to face the first and second magnet portions 141 and 151, respectively.

When power is applied to the first and second coil portions 142 and 152, the first rotation holder 120 or the second holder 130, on which the magnet portions 141 and 151 are respectively mounted, may rotate around a first axis (an X-axis) or a second axis (a Y-axis) due to an electromagnetic interaction between the magnet portions 141 and 151 and the coil portions 142 and 152, respectively.

Specifically, the driving portion 160 may include a first driving portion 140 configured to rotate the first rotation holder 120, and a second driving portion 150 configured to rotate the second rotation holder 130.

The first driving portion 140 may include the first magnet portion 141, which is mounted on the first rotation holder 120, and the first coil portion 142, which is spaced apart from the first magnet portion 141 by a predetermined distance in a position facing the first magnet portion 141.

The first magnet portion 141 may include one or more magnets, and may be coupled to a lower portion of the shaft coupling portion 124. To this end, the lower portion of the shaft coupling portion 124 may include a groove in which the first magnet portion 141 is inserted.

The first coil portion 142 may include one or more coils. As illustrated in FIG. 7, the first coil potion 142 may be mounted on a circuit board 430 in a position facing the first magnet portion 141. To this end, the module case 410 may include a first opening 414a formed to have a region facing a lower portion of the shaft coupling portion 124, and the circuit board 430 may be disposed in such a manner that at least a portion of the circuit board 430 covers the first opening 414a. In addition, at least a portion of the first coil portion 142 may be disposed in the first opening 414a of the module case 410.

A yoke 143 may be disposed between the first magnet portion 141 and the shaft coupling portion 124 to form an efficient magnetic path. The yoke 143 may be formed of a metal material, and may induce a flow of a magnetic field to improve the intensity of the magnetic field.

The second driving portion 150 may include the second magnet portion 151, which is mounted on an external surface of one side portion 131 of the second rotation holder 130, and a coil portion 152 spaced apart from the second magnet portion 151 by a predetermined distance in a position facing the second magnet portion 151.

The second driving portion 150 may be mounted on only the one of the two side portions 131. However, the disclosure is not limited to this configuration, and the second driving portion 150 may be mounted on both side portions 131, as necessary.

The second magnet part 151 may include one or more magnets, and may be coupled to the external surface of the one side portion 131. To this end, the external surface of the one side portion 131 may include a groove in which the second magnet portion 151 is inserted and disposed.

The second coil portion 152 may include one or more coils, and may be mounted on the circuit board 430 in a position facing the second magnetic portion 151. To this end, the module case 410 may include a second opening 414b formed in a region facing the one side portion 131, and the circuit board 430 may be disposed in such a manner that at least a portion of the circuit board 430 covers the second opening 414b. In addition, at least a portion of the second coil portion 152 may be disposed in the second opening 414b of the module case 410.

Similarly to the first driving portion 140, a yoke 153 may be disposed between the second magnet portion 151 and the one side portion 131 to form an efficient magnetic path.

The camera module 400 may rotate the optical path change module 100 to compensate for blurring of an image or shaking of a video caused by factors such as user hand-shake, and the like, during image capture or video capture.

For example, when shaking occurs due to user hand-shake or the like during image capturing or video capturing, a relative displacement corresponding to the shaking may be provided to the first rotation holder 120 and the second rotation holder 130 to compensate for the shaking.

An OIS function may be implemented by rotating the reflection member 110 having a relatively light weight, rather than by directly moving the lens module 200 or the image sensor 310. Thus, power consumption of the camera module 400 may be significantly reduced.

In addition, the optical path change module 100 may include the first pivot axis P1 disposed below the mounting surface 121 on which the reflection member 110 is mounted. In addition, the first pivot axis P1 and the second pivot axis P2 may be disposed to intersect each other. Accordingly, a radius of rotation of the reflection member 110 may be significantly reduced, and thus, a size of the camera module 400 may be significantly reduced.

Moreover, since a shaft and a sleeve constituting forming a pivot axis are provided to be in point contact with each other, frictional force applied during pivoting may be significantly reduced. Thus, power consumed to rotate the reflection member 110 may be significantly reduced.

The disclosure is not limited to the above-described example, and various modifications may be made.

Figure 9:
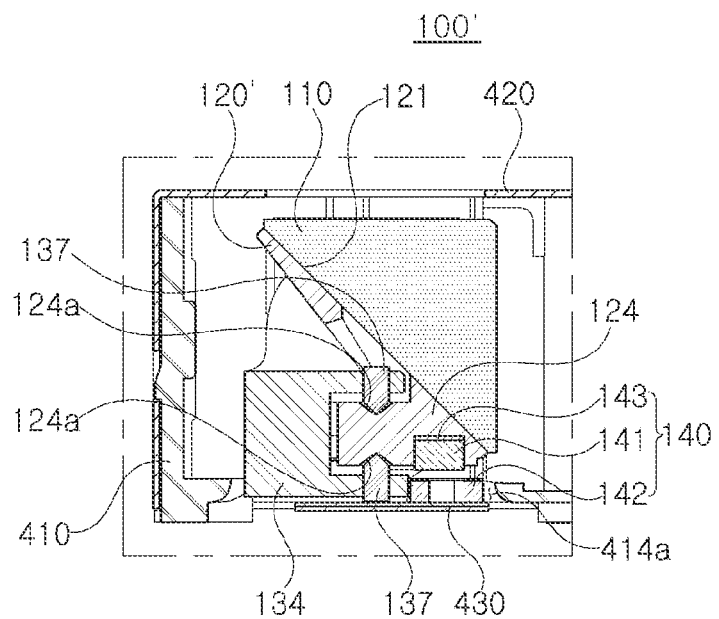
FIGS. 9 and 10 are cross-sectional views of an optical path change module, according to another example.
Figure 10:
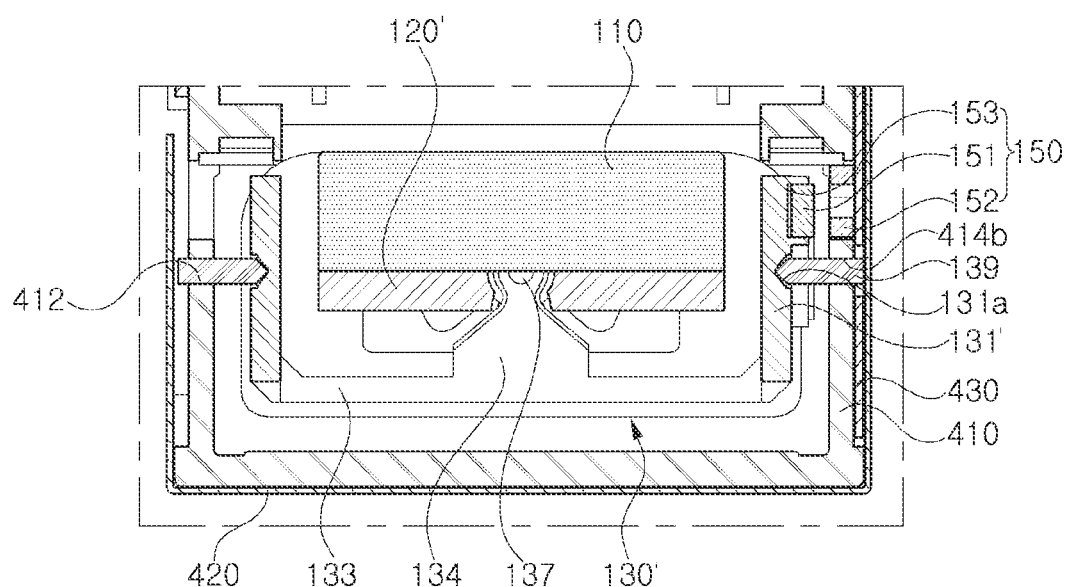

FIGS. 9 and 10 are cross-sectional views of an optical path change module 100', according to another example. FIG. 9 illustrates a cross section corresponding to a cross section taken along line I-I' of FIG. 5, and FIG. 10 illustrates a cross section corresponding to a cross section taken along line II-II' of FIG. 5.

Referring to FIGS. 9 and 10, the optical path change module 100' has a configuration similar to the configuration of the optical path change module 100, but a difference therebetween lies in omission of the first sleeve (126 of FIG. 3) and the second sleeve (138 of FIG. 3) in the optical path change module 100'.

Since the first sleeve 126 is omitted, a shaft coupling portion 124' of a first rotation holder 120' in the optical path change module 100' may include with insertion grooves 124a, formed in both upper and lower surfaces of the shaft coupling portion 124', rather than a fastening hole. The insertion grooves 124a may be formed in the first pivot axis P1, and may have the same shape or size as the above-described insertion grooves 126a formed in both ends of first sleeve 126. However, the disclosure is not limited to this configuration.

Similarly, since the second sleeve 138 is omitted, a second rotation holder 130' of the optical path change module 100' may include side portions 131' including insertion grooves 131a formed in an external surface facing a module case 410, rather than a fastening hole. The insertion grooves 131a may have the same shape or size as the above-described insertion grooves 138a of the second sleeves 138 described above. However, the disclosure is not limited to this configuration.

Figure 11:
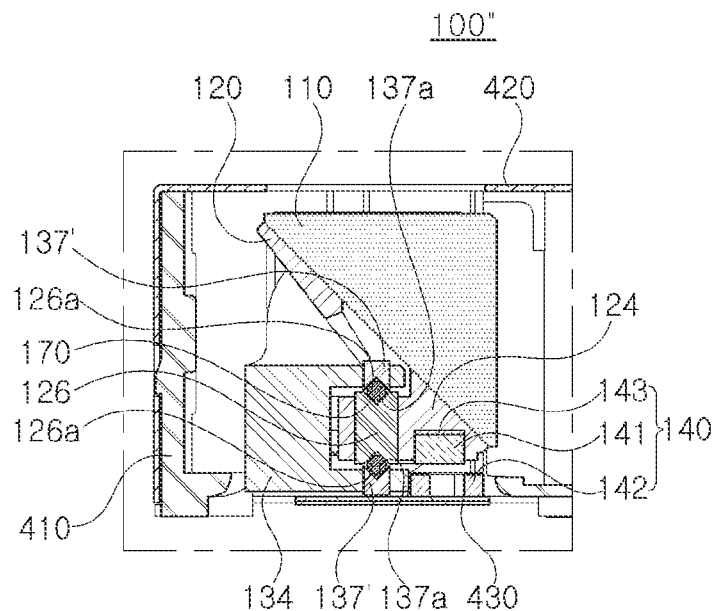
FIGS. 11 and 12 are cross-sectional views of an optical path change module according to another example.
Figure 12:
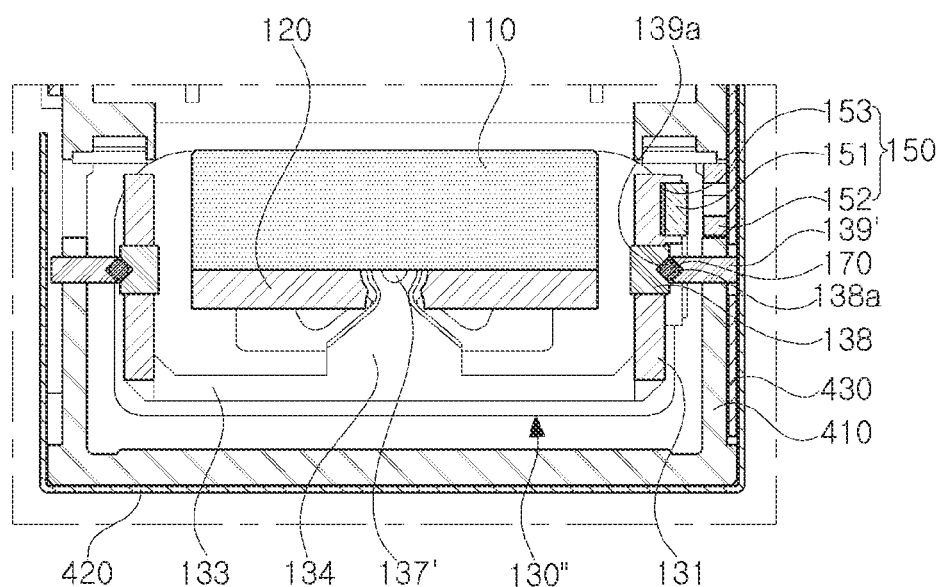

FIGS. 11 and 12 are cross-sectional views of an optical path change module 100", according to another example. FIG. 11 illustrates a cross section corresponding to a cross section taken along line I-I' of FIG. 5, and FIG. 12 illustrates a cross section corresponding to a cross section taken along line II-II' of FIG. 5.

Referring to FIGS. 11 and 12, the optical path change module 100" may include spherical members 170 disposed between first shafts 137' of a second rotation holder 130" and the first sleeve 126, and spherical members 170 disposed between the second sleeves 138 and second shafts 139'.

End portions of the first shafts 137', facing the first sleeve 126, may be not formed to have a sharp shape, but may include insertion grooves 137a to easily couple the spherical member 170 to the first shafts 137'. Accordingly, at least a portion of a spherical member 170 may be inserted into an insertion groove 126a of the first sleeve 126 and another portion of the spherical member 170 may be inserted into an insertion groove 137a of a first shaft 137'.

The spherical members 170 may be in line contact with the first shafts 137' or the first sleeve 126. However, the disclosure is not limited to this configuration, and shapes of the insertion grooves 126a may be modified such that the spherical members 170 are in point contact with the first shaft 137' and the first sleeve 126.

Similarly, end portions of the second shafts 139' may also include insertion grooves 139a, and at least a portion of a spherical member 170 may be inserted into an insertion groove 138a of a respective second sleeve 138 and another portion of the spherical member 170 may be inserted into an insertion groove 139a of a respective second shaft 139'.

In addition, a lubricant may be provided to surfaces of the spherical members 170 to reduce frictional force with the first and second shafts 137' and 139', and the first sleeve 126 and the second sleeves 138.

The spherical members 170 are not limited to the example of FIGS. 11 and 12, and the spherical members 170 may be applied to the example of FIGS. 9 and 10 in which the first sleeve 126 and the second sleeves 138 are omitted.

Figure 13:
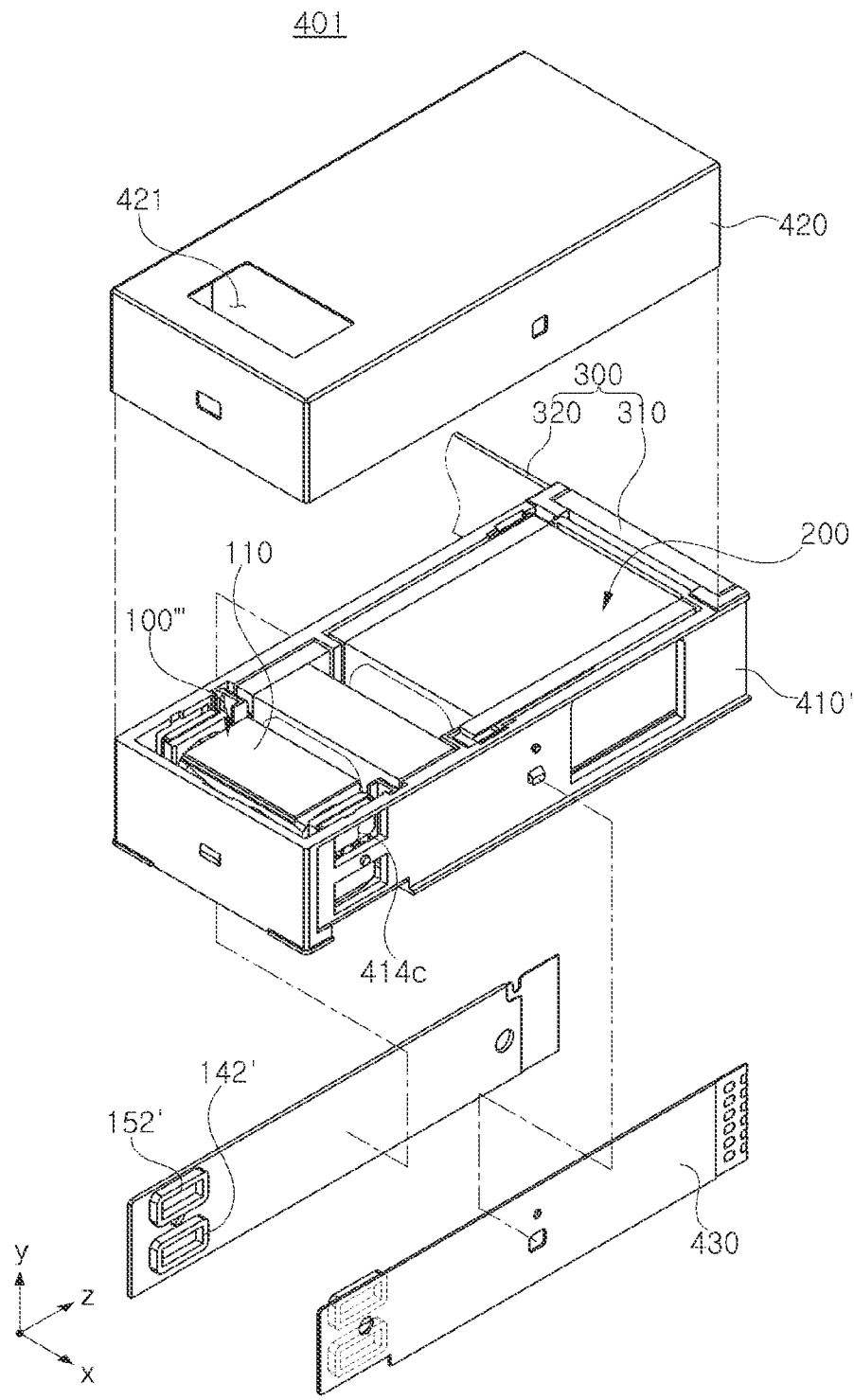
FIG. 13 is a partial exploded perspective view of a camera module, according to another example.
Figure 14:
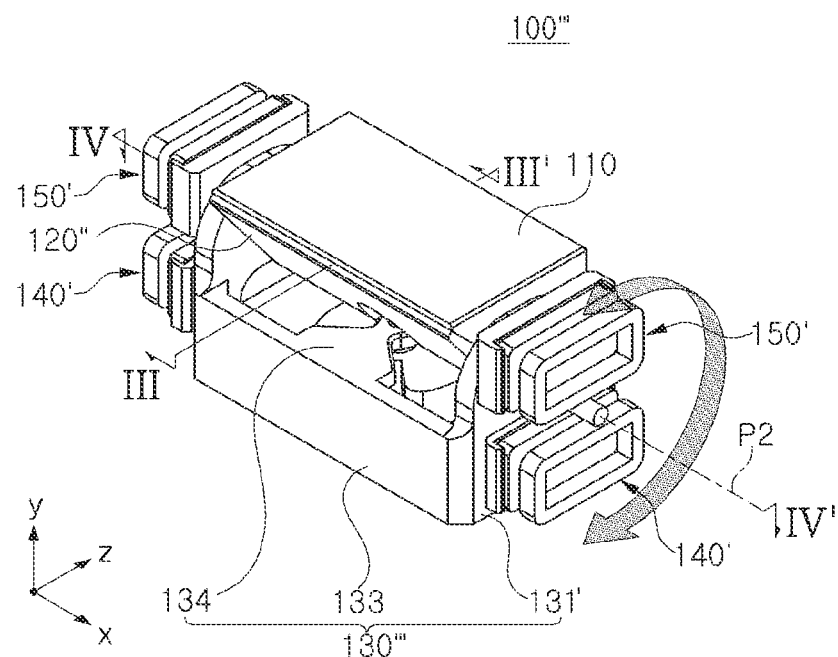
FIG. 14 is a perspective view of an optical path change module illustrated in FIG. 13.
Figure 15:
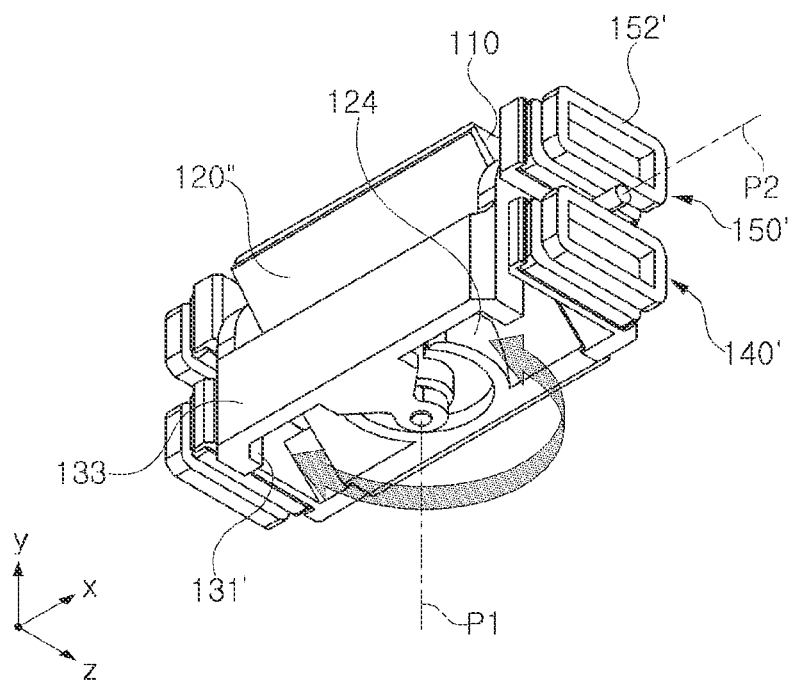
FIG. 15 is a bottom perspective view of the optical path change module illustrated in FIG. 14.
Figure 16:
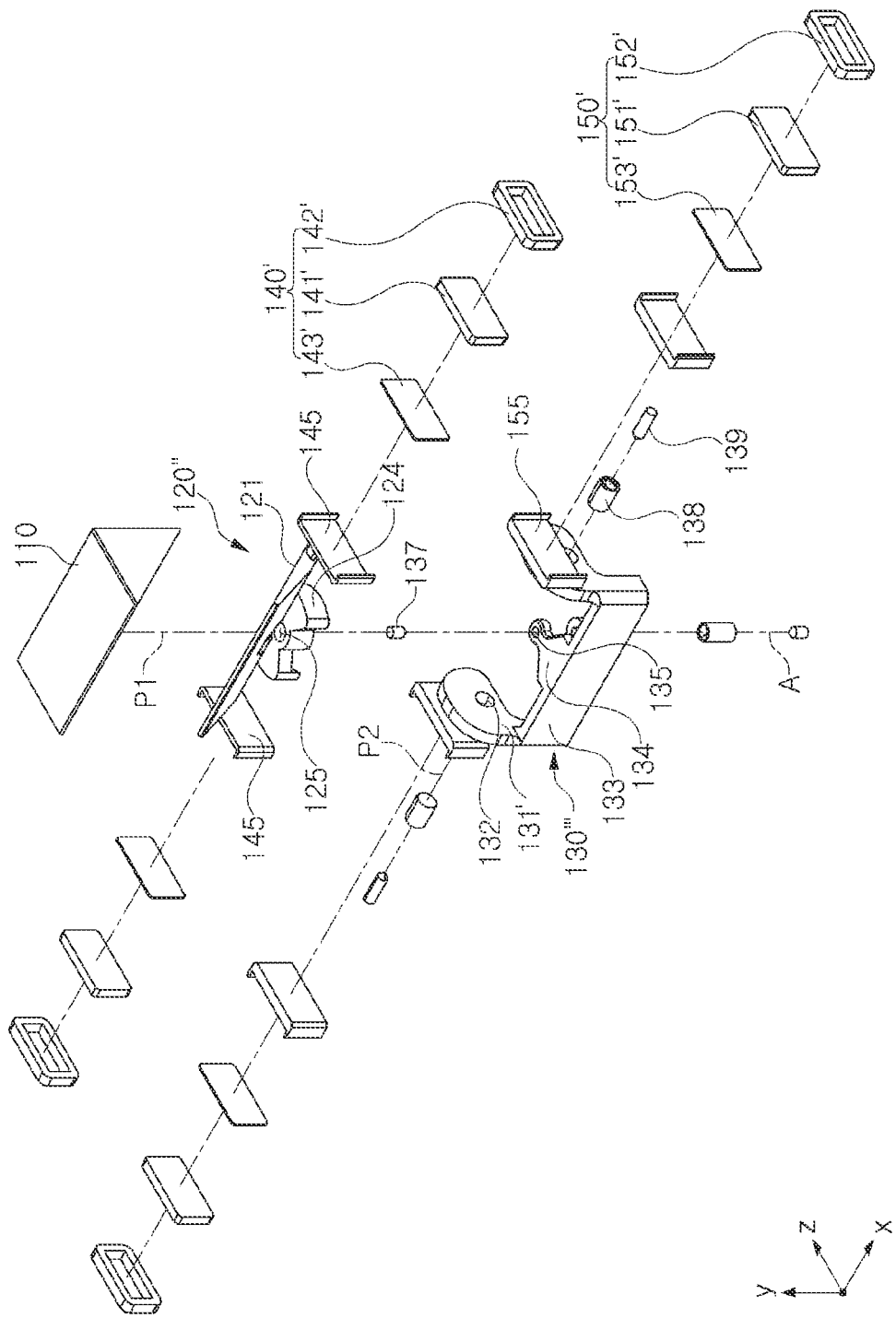
FIG. 16 is an exploded perspective view of the optical path change module illustrated in FIG. 14.
Figure 17:
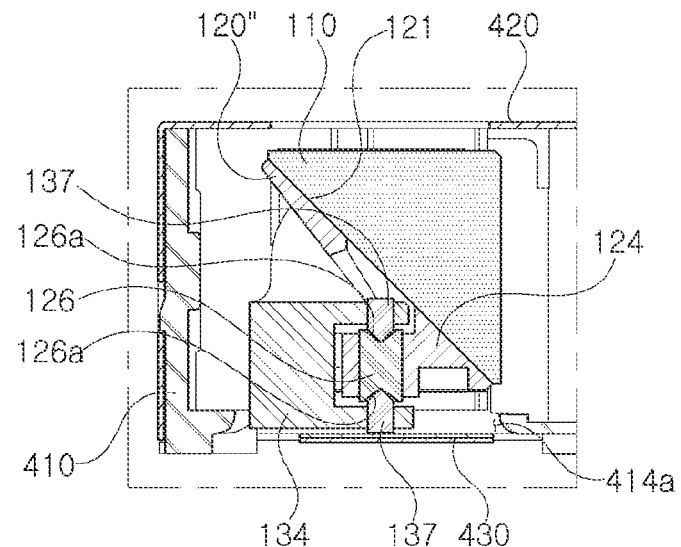
FIG. 17 is a cross-sectional view taken along line III-III' of FIG. 14.
Figure 18:
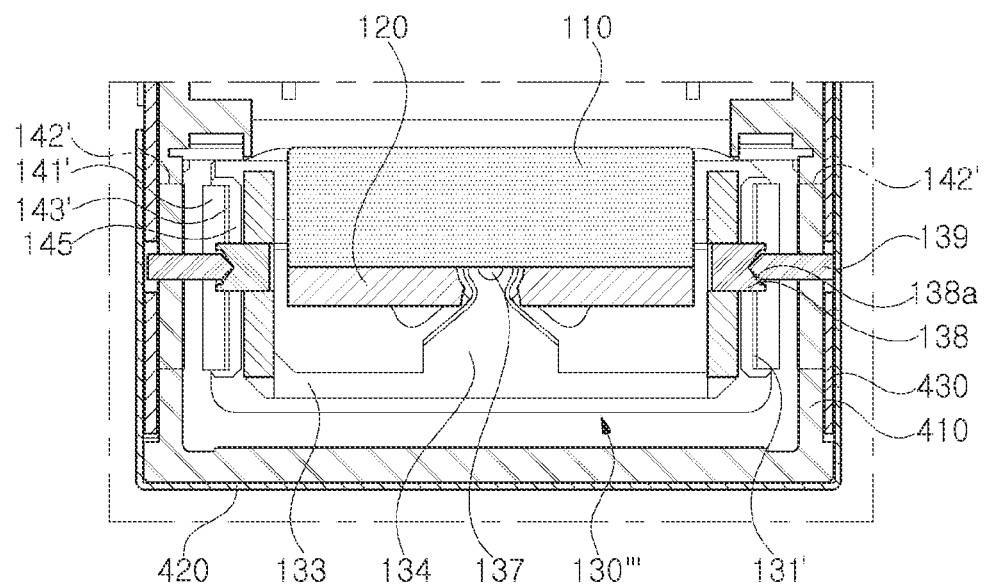
FIG. 18 is a cross-sectional view taken along line IV-IV' of FIG. 14.

FIG. 13 is a partial exploded perspective view of a camera module 401, according to another example. FIG. 14 is a perspective view of an optical path change module 100''' illustrated in FIG. 13. FIG. 15 is a bottom perspective view of the optical path change module 100''' illustrated in FIG. 14. FIG. 16 is an exploded perspective view of the optical path change module 100''' illustrated in FIG. 14. FIG. 17 is a cross-sectional view taken along line III-III' of FIG. 14. FIG. 18 is a cross-sectional view taken along line IV-IV' of FIG. 14.

Referring to FIGS. 13 to 18, the optical path change module 100''' may include a first driving portion 140' and a second driving portion 150'. The first driving portion 140' may be disposed parallel to the second driving portion below the second driving portion 150', rather than below the shaft coupling portion 124.

The first driving portion 140' may be disposed on both side surfaces of a mounting surface 121, rather than below the mounting surface 121. To this end, a first rotation holder 120" may include first seating portions 145 on both sides of the mounting surface 121'.

The first seating portions 145 may be formed in flat plate shape, and may be disposed to be orthogonal to the mounting surface 121. First magnet portions 141' of the first driving portion 140' may be mounted on the first seating portions 145. Therefore, a shape of the first seating portions 145 is not limited to a plate shape, and may be modified in various shapes as long as the first magnet portions 141' may be seated in the first seating portions 145.

Since the first driving portion 140' is disposed below the second driving portion 150', a side portions 131' of a second rotation holder 130''' may be formed to have open regions in which the first seating portions 145 are disposed. For example, the second driving portion 150' may be disposed above the second pivot axis P2 and the first driving portion 140' may be disposed below the second rotation axis P2. In addition, the first seating portions 145 and the second rotation holder 130''' may be spaced apart from each other by a predetermined distance to rotate the first rotation holder 120'' without interference with the second rotation holder 130'''.

The second driving portion 150' may include second seating portions 155' on which second magnet portions are 151' are seated. The second seating portions 155 may be formed to have a shape a similar to the shape of the first seating portions 145, and may be disposed parallel to the first seating portions 145, with the second pivot axis P2 interposed between the first and second seating portions 145 and 155.

Accordingly, first coil portions 142' and the second coil portions 152' may also be disposed parallel to the circuit board 430. In addition, a module case 410' may include an opening 414c into which a first coil portion 142' and a second coil portion 152' are inserted, and at least a portion of the circuit board 430 may be disposed to cover the opening 414c.

Similarly to the above-described embodiment, yokes 143' and 153' may be interposed between first and second magnet portions 141' and 151' and the first and second seating portions 145 and 155, respectively.

The optical path change module 100''' may include two first driving portions 140', respectively disposed on both side surfaces of the first rotation holder 120''.

The first rotation holder 120'' should rotate around a first axis (a Y-axis). Therefore, if the two first driving portions 140' are simultaneously driven in the same direction (a Z-axis direction), it may be difficult to rotate the first rotation holder 120''.

Accordingly, only one of the two first driving portions 140' may be configured to be selectively driven, or the two first driving portions 140' may be configured to be driven in opposite directions (the Z-axis direction and the negative Z-axis direction). In addition, when torque provided by one first driving portion 140' is sufficient, only one first driving portion 140' may be provided.

Two second driving portions 150' may be driven in the same direction, and the second rotation holder 130''' may rotate around the X-axis. For example, the second driving portions 150' may be driven to move the second rotation holder 130''' in the Z-axis direction, and thus the second rotation holder 130''' may rotate around the second pivot axis P2.

In the example of FIGS. 13 to 18, a description has been given of a case in which second driving portions 150' are provided on both sides of the second rotation holder 130''', respectively. However, the present disclosure is not limited to this configuration. For example, when torque provided by a single driving portion is sufficient, a second driving portion 150' may be provided on only one side of the second rotation holder 130'''.

Figure 19:
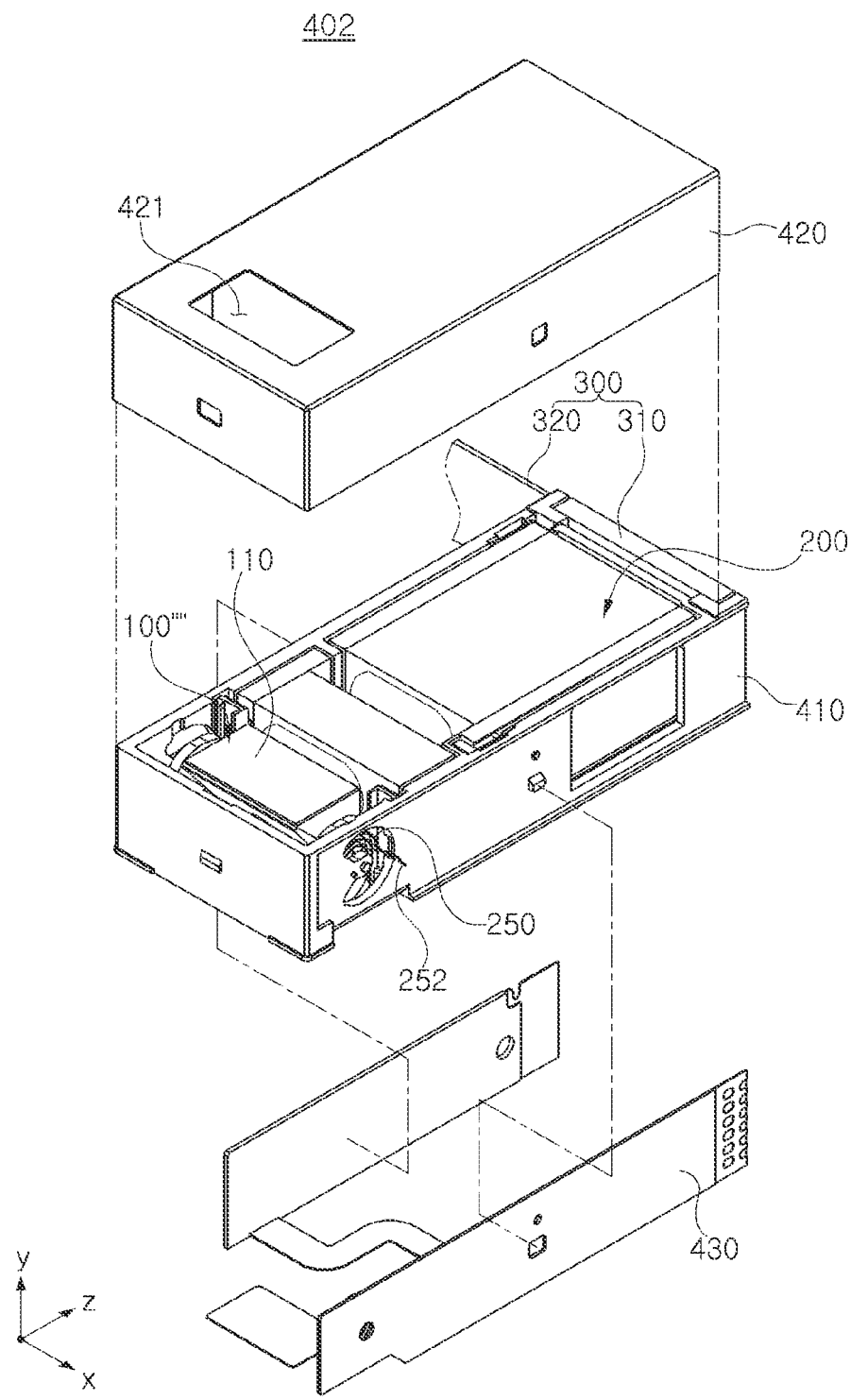
FIG. 19 is a partial exploded perspective view of a camera module, according to another example.
Figure 20:
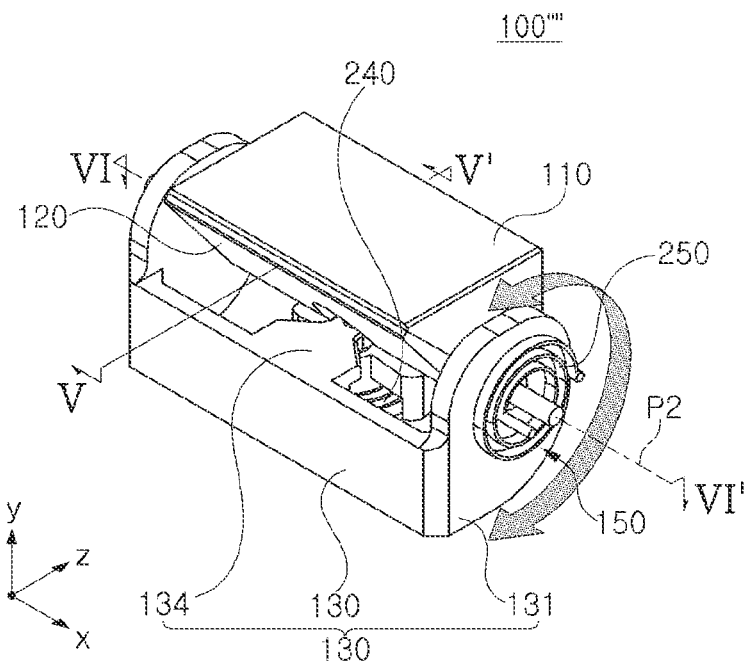
FIG. 20 is a perspective view of an optical path change module illustrated in FIG. 19.
Figure 21:
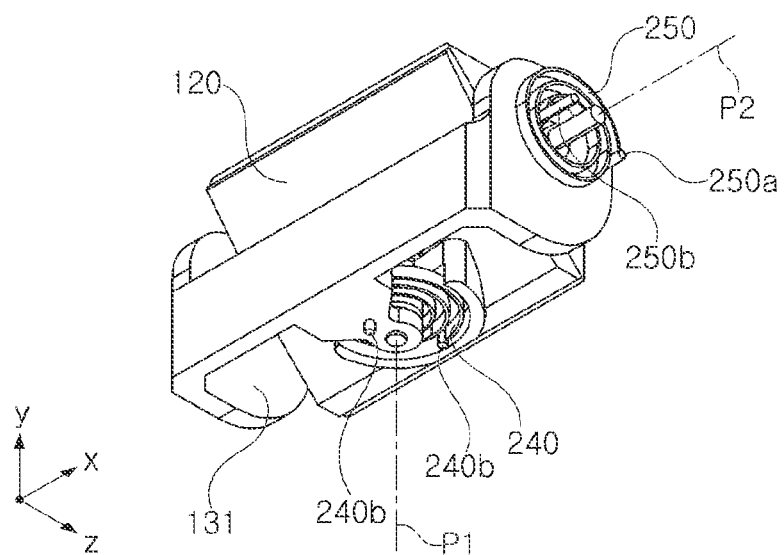
FIG. 21 is a bottom perspective view of the optical path change module illustrated in FIG. 20.
Figure 22:
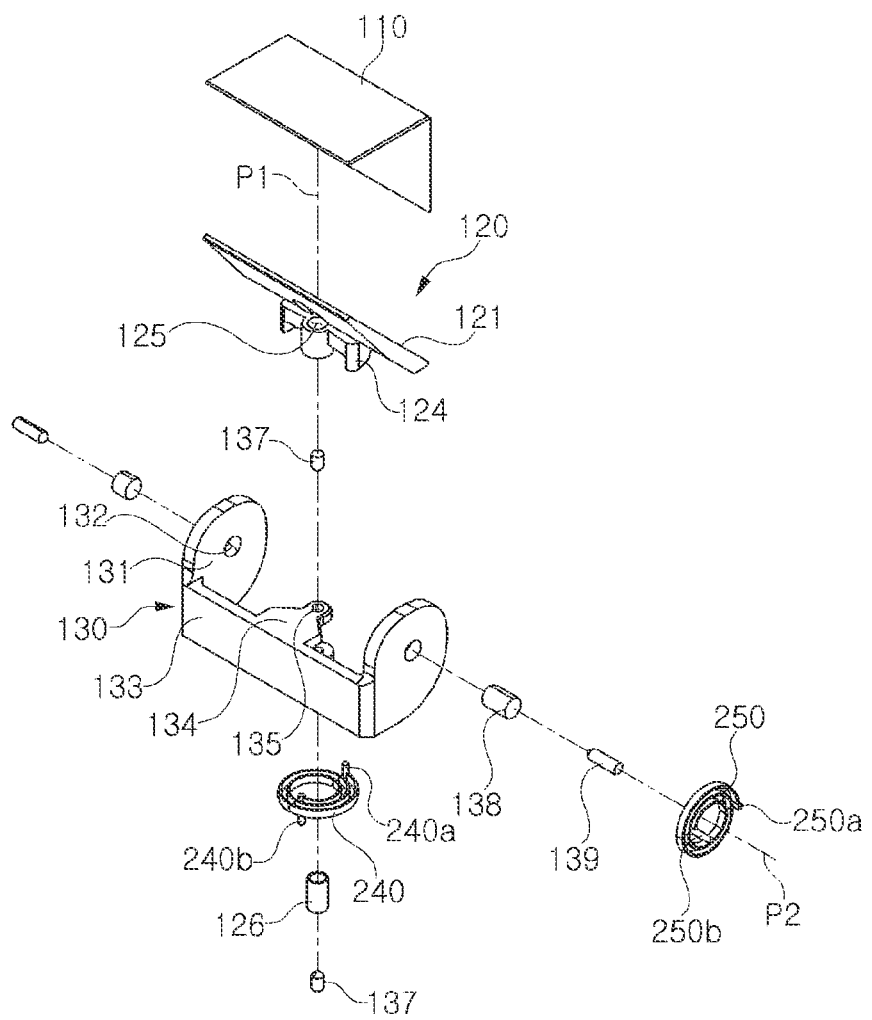
FIG. 22 is an exploded perspective view of the optical path change module illustrated in FIG. 20.
Figure 23:
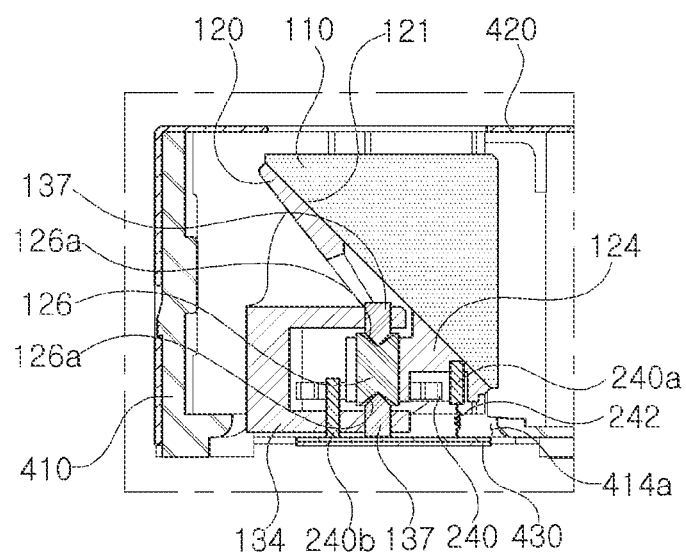
FIG. 23 is a cross-sectional view taken along line V-V' of FIG. 20.
Figure 24:
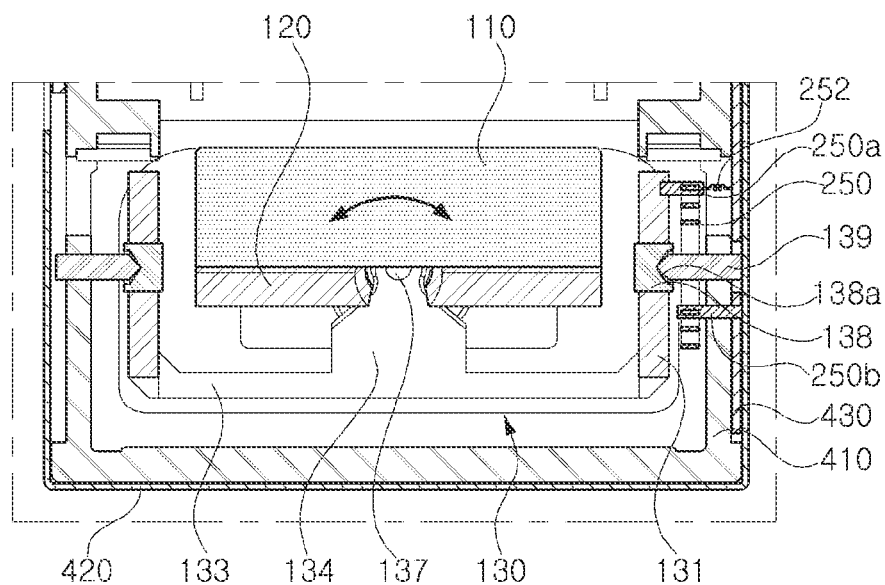
FIG. 24 is a cross-sectional view taken along line VI-VI' of FIG. 20.

FIG. 19 is a partial exploded perspective view of a camera module 402, according to another example. FIG. 20 is a perspective view of an optical path change module 100'''' illustrated in FIG. 19. FIG. 21 is a bottom perspective view of the optical path change module 100''''. FIG. 22 is an exploded perspective view of the optical path change module 100''''. FIG. 23 is a cross-sectional view taken along line V-V' of FIG. 20. FIG. 24 is a cross-sectional view taken along line VI-VI' of FIG. 20.

Referring to FIGS. 19 to 24, the optical path change module 100'''' may include a first driving portion 240 and a second driving portion 250. Either one or both of the first driving portion 240 and the second driving portion 250 may be a spiral spring member. Accordingly, the first driving portion 240 and the second driving portion 250 will be referred to as a "first spiral member" and a "second spiral spring member" hereinafter.

The first spiral spring member 240 may be disposed between the lower surface of a shaft coupling portion 124 of the first rotation holder 120 and one holder support portion 134 of the second rotation holder 130. One end 240a of the first spiral spring member 240 may be fastened to the lower surface of the shaft coupling portion 124, and the other end 240b of the first spiral spring member 240 may be fastened to the one holder support portion 134 of the second rotation holder 130.

The second spiral spring member 250 may be disposed between one side portion 131 of the second rotation holder 130 and the module case 410. One end 250a of the second spring member 250 may be fastened to an external surface of the one side portion 131, and the other end 250b of the second spiral spring member 250 may be fastened to an internal surface of the module case 410.

The first and second spiral spring members 240 and 250 may be formed of a shape-memory alloy. In this case, when current is applied to the first or second spiral spring member 240 or 250, the first or second spiral spring member 240 or 250 may be deformed in a direction in which a length of the first or second spiral spring member 240 or 250 is decreased or increased. When supply of the current is cut off, the deformed first or second spiral spring member 240 or 250 may be restored to an original state thereof.

Accordingly, the first spiral spring member 240 and the second spiral spring member 250 may rotate the first rotation holder 120 or the second rotation holder 130 through the current control using properties of the shape memory alloy.

To this end, both ends of the first spiral spring member 240 and the second spiral spring member 250 may be electrically connected to a circuit board 430.

For example, the first spiral spring member 240 may be disposed to be wound around the first sleeve 126. The one end 240a of the first spiral spring member 240 may be connected to the circuit board 430, which is disposed on an external side of the holder support portion 134, through a first connection wire 242. The other end 240b of the first spiral spring member 240b may be connected to the circuit board 430 through the holder support potion 134. To this end, the shaft coupling portion 124 may include a groove in which the first spiral spring member 240 is disposed.

In addition, the first connection wire 242 may be formed of a conducting wire which may be stretched with the rotation of the first rotation holder 120. For example, the first connection wire 242 may be formed of a conducting wire which may be formed into a coil to be elastically stretched. However, the disclosure is not limited to this example, and various modifications may be made. For example, the first connection wire 242 may be formed of a flexible printed circuit board (FPCB).

The second spiral spring member 250 may be disposed to be wound around one of the second shafts 139 disposed between the one side portion 131 and the module case 410. The one end 250a of the second spiral spring member 250 may be disposed on an external surface of the module case 410 through a second connection wire 252. The other end 250b of the second spiral spring member 250 may be connected to the circuit board 430 through the module case 410.

The second connection wire 252 may be formed in the same manner as the first connection wire 242, but the disclosure is not limited to this example.

In the example of FIGS. 19 to 24, a description has been given of a case in which each of the first and second driving portions 240 and 250 includes a single spiral spring member. However, the disclosure is not limited to this example, and various modifications may be made, as necessary. For example, each of the first and second driving portions 240 and 250 may include a plurality of spiral spring members.

According to the disclosure herein, an optical path change module and a camera module including the optical path change module may simplify a structure and reduce a size, while implementing functions such as an autofocusing (AF) function, a zoom function, an optical image stabilization (OIS) function, and the like. Additionally, an optical path change module and a camera module including the optical path change module according to the disclosure herein may significantly reduce power consumption.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is to be defined not by the detailed description, but by the claims and their equivalents, and all variations within the scope of the claims and their equivalents are to be construed as being included in the disclosure.

What is claimed is:

1. An optical path change module, comprising:
a first rotation holder comprising a shaft coupling portion;
a reflection member disposed on the first rotation holder, and configured to change a path of light;
a second rotation holder configured to support the first rotation holder; and
a module case accommodating the second rotation holder,
wherein the first rotation holder is coupled to the second rotation holder, and configured to rotate around a first pivot axis,
wherein the second rotation holder is coupled to the module case, and configured to rotate around a second pivot axis intersecting the first pivot axis, and
wherein a sleeve is inserted into the shaft coupling portion and is configured to have ends in which insertion grooves are respectively formed.

2. The optical path change module of claim 1, wherein the first pivot axis extends through the reflection member.

3. The optical path change module of claim 2, wherein the first rotation holder comprises a mounting surface on which the reflection member is mounted, and a shaft coupling portion disposed on a rear surface of the mounting surface such that the shaft coupling portion is rotatably coupled to the second rotation holder.

4. The optical path change module of claim 3, further comprising:

shafts coupled to the second rotation holder and having end portions respectively inserted into the insertion grooves.

5. The optical path change module of claim 4, wherein the shafts are in point contact with and coupled to the sleeve.

6. The optical path change module of claim 3, wherein the second rotation holder comprises side portions respectively disposed on sides of the first rotation holder, and a connection portion connecting the side portions to each other, and
wherein the second pivot axis extends through the side portions.

7. The optical path change module of claim 6, further comprising:
a sleeve inserted into one of the side portions and having end in which an insertion groove is formed; and
a shaft coupled to the module case and having an end portion inserted into the insertion groove.

8. The optical path change module of claim 6, further comprising:
a first driving portion configured to rotate the first rotation holder about the first pivot axis; and
a second driving portion configured to rotate the second rotation holder about the second pivot axis.

9. The optical path change module of claim 8, wherein the first driving portion comprises:
a first magnet portion disposed on a lower surface of the shaft coupling portion; and
a first coil portion facing the first magnet portion and spaced apart from the first magnet portion by a predetermined distance.

10. The optical path change module of claim 8, wherein the second driving portion comprises:
a second magnet portion disposed on an external surface of one of the side portions; and
a second coil portion facing the second magnet portion and spaced apart from the second magnet portion by a predetermined distance.

11. The optical path change module of claim 8, wherein the second driving portion is disposed on an external surface of one of the side portions and disposed above the second pivot axis, and
wherein the first driving portion is disposed parallel to the second driving portion below the second pivot axis.

12. The optical path change module of claim 8, wherein the first driving portion comprises a spiral spring member, and
wherein the spiral spring member has one end fastened to the shaft coupling portion, and another end fastened to the second rotation holder.

13. The optical path change module of claim 8, wherein the second driving portion comprises a spiral spring member, and
wherein the spiral spring member has one end fastened to the side portion, and another other end fastened to the module case.

14. The optical path change module of claim 8, wherein either one or both of the first driving portion and the second driving portion comprises a spiral spring member, and
wherein the spiral spring member is formed of a shape-memory alloy.

15. An optical path change module, comprising:
a first rotation holder;
a reflection member disposed on the first rotation holder, and configured to change a path of light;
a second rotation holder configured to support the first rotation holder; and
a module case accommodating the second rotation holder, wherein the first rotation holder is coupled to the second rotation holder, and configured to rotate around a first pivot axis, wherein the second rotation holder is coupled to the module case, and configured to rotate around a second pivot axis intersecting the first pivot axis, wherein the second rotation holder comprises side portions respectively disposed on sides of the first rotation holder, and a connection portion connecting the side portions to each other, wherein a sleeve is fastened to one of the side portions and has an end in which a first insertion groove is formed, wherein a shaft is fastened to the module case and has an end portion in which a second insertion groove is formed, and wherein a spherical member is inserted into the first insertion groove and the second insertion groove to connect the sleeve and the shaft to each other.

16. The optical path change module of claim 3, further comprising:
a sleeve inserted into the shaft coupling portion and having an end in which an insertion groove is formed;
a shaft coupled to the second rotation holder and having an end portion in which an insertion groove is formed; and
a spherical member inserted into the first and second insertion grooves to connect the sleeve to the shaft.

17. The optical path change module of claim 3, wherein the shaft coupling portion includes an insertion groove formed on the first pivot axis, and
wherein the optical path change module further comprises a shaft having one end inserted into the insertion groove and the other end fastened to the second rotation holder.

18. An optical path change module, comprising:
a first rotation holder;
a reflection member disposed on a mounting surface of the first rotation holder, and configured to change a path of light; and
a second rotation holder configured to support the first rotation holder, wherein the first rotation holder comprises a shaft coupling portion disposed on a rear surface of the mounting surface such that the shaft coupling portion is rotatably coupled to the second rotation holder, wherein the shaft coupling portion includes an insertion groove formed along a pivot axis of the first rotation holder, and wherein the second rotation holder is inserted into the insertion groove such that the second rotation holder is in point contact with the shaft coupling portion.

19. A camera module, comprising:
an optical path change module comprising:
a first rotation holder comprising a shaft coupling portion;
a reflection member disposed on the first rotation holder, and configured to change a path of incident light;
a second rotation holder configured to support the first rotation holder; and
a module case accommodating the second rotation holder;
a lens module disposed in the module case and comprising a plurality of lenses; and
an image sensor module configured to convert light passing through the plurality of lenses into an electrical signal, wherein the first rotation holder is coupled to the second rotation holder, and configured to rotate around a first pivot axis, and wherein the second rotation holder is coupled to the module case, and configured to rotate around a second pivot axis intersecting the first pivot axis, and wherein a sleeve is inserted into the shaft coupling portion and is configured to have ends in which insertion grooves are respectively formed.

* * * * *